United States Patent Office 2,992,960
Patented July 18, 1961

2,992,960
HIGH TEMPERATURE RESISTANT MATERIALS CONTAINING BORON AND METHOD OF MANUFACTURE THEREOF
Kenton J. Leeg, Garden Grove, David A. Yeomans, Santa Ana, and William E. Ripley, Jr., Whittier, Calif., assignors, by mesne assignments, of small interests to various assignees
No Drawing. Filed June 18, 1958, Ser. No. 742,730
20 Claims. (Cl. 154—128)

The present invention relates to high temperature resistant materials and to methods for their manufacture.

More particularly the present invention relates to the improvement of the high temperature resistance of various materials including fibrous products and especially to products produced by the assembly or lamination of such fibrous materials of both organic and inorganic nature. In its more specific aspects the present invention relates to inorganic fibrous products having increased temperature resistance and to methods for the production of such products.

The search for materials resistant to high temperatures has been intensified by the rapid development of high speed jet aircraft, supersonic missiles and other applications in which structural elements are exposed to extremely high temperatures. Certain metals, and alloys thereof, will withstand high temperatures encountered in exhaust systems of jet aircraft, high skin temperatures of supersonic aircraft and missiles, and in structural elements utilized in the combustion of solid or liquid chemical fuels utilized in such missiles. However, it is not always practical or feasible to produce structural elements of such metals due to high cost, difficulty of fabrication, lack of availability of materials and other factors. Attempts have been made to utilize various refractory materials such as glass or asbestos fibers formed into shaped components such as ducts, fuel nozzles, nose cones, skin coverings and the like, especially in the form of bonded or laminated fibers or fabrics woven therefrom. Such attempts have included the use of glass fibers treated to increase their melting and softening points by leaching to remove less refractory oxides and leave a residue consisting essentially of high silica content, for example, as described in U.S. Patent 2,491,761 and others.

In general, the use of fibers or fabrics or similar materials produced therefrom, whether of organic or inorganic nature, has involved the use of various types of binding agents, usually of a resinous nature, for the purpose of holding the fibers together, permitting the composition to be properly handled and shaped, and providing the requisite strength to permit utilization in handling under normal conditions or at somewhat elevated temperatures. Such resinous materials are usually of a thermo-setting nature such as the phenol-formaldehyde, phenol-furfural, epoxy resins, melamine-formaldehyde resins, and similar resins of a thermo-setting nature or blends or mixtures thereof. In many cases thermoplastic resins such as nylon may also be used as binders. In the use of such materials, the limiting factors which determine the utility for a given high temperature purpose are the factors of time and temperature. It has been found that as long as the binder remains in existence, at least in some form, the composite product will retain at least a certain degree of strength. However, when the binder is consumed by combustion or otherwise disintegrates at high temperatures, it has been found that the structural strength of these composite materials disappears and they tend to disintegrate for lack of any cohesive material which will hold the fibers together. For example, it has been found that certain phenolic resins function as binders of fibrous refractory materials such as fiberglass, asbestos or the like, up to about 500 degrees Fahrenheit for 400 to 500 hours of continuous exposure with the product losing only about 50% of its strength. For shorter periods, these resins will function as binders at temperatures up to 1,000 degrees F. for periods of 15 to 20 minutes. Silicone resins have been found to provide binders which stand up reasonably well for extended periods of time up to about 700 degrees F. Teflon (polytetrafluoroethylene) binders, although thermoplastic in nature, have been found to retain their strength over extended periods of time at temperatures up to about 600 degrees F.

When it is realized that compositions of the type mentioned above, utilizing conventional resinous binders, represent the maximum degree of temperature resistance now attainable, it is apparent that the necessity for the development of materials adapted to withstand considerably high temperatures becomes more and more essential. Ducts for exhaust gases and nozzles for propellants and fuels, as well as heat-resistant liners and skins, require materials which will withstand temperatures up to several thousand degrees F. at least for short periods of time. At the present time, these products must be formed of metals such as titanium, tungsten, molybdenum or of graphite, although refractory materials such as asbestos and fiberglass have been used to a certain extent. An important drawback in connection with graphite is that it has very low strength even at normal temperatures. In connection with metals such as molybdenum or tungsten or alloys thereof, apart from the matter of expense, these are difficult to shape or form or to cast. Furthermore, materials such as graphite as well as metal alloys become eroded to some extent at elevated temperatures. For example, when utilized for rocket nozzles, there is a great loss of thrust through high temperature erosion with resultant loss of power. Thus, materials are required which will not only have high temperature resistance but will also have superior resistance to high velocity and high temperature gases. As indicated above, among the best materials now available for these purposes are refractory materials such as asbestos or fiberglass or leached glass fibers bonded by resins, and formed into desired shapes by lamination or molding or by lamination in a partially reacted state followed by shaping and setting of the resinous binder by the application of heat.

When materials of the prior art are utilized as binders at temperatures higher than about 1,000 degrees F., it is found that the organic material is completely consumed and the fibrous residue, whether of woven fabric or loose fibrous nature, retains little or no cohesive character with the result that separation and disintegration of the product occurs.

Applicants have discovered, in accordance with the present invention, that by incorporation of elemental boron in a binder for materials of the type described, products may be obtained which retain a substantial proportion of their shape and structural strength characteristics at temperatures considerably greater than would be possible without such incorporation. Furthermore, applicants have discovered that by the incorporation of small proportions of elemental boron along with a resinous binder for fibrous materials, even structures formed of organic fibers will possess improved high temperature resistance, while structures from inorganic refractory fibers will be able to withstand temperatures of 2,000 degrees F. or higher for substantial periods of time while retaining much of their strength and shape characteristics, and will even withstand temperatures up to several thousand degrees for short periods of time while retaining their shape and sufficient strength characteristics to perform their desired functions without disintegration. Applicants have also discovered that the utilization of elemental boron as an additive to a resinous binder for refractory fibers will produce a composition which can be formed into products which will not only have a superior high temperature resistance but will also have improved resistance to erosion during contact with high-velocity, high-temperature gases. The incorporation of boron is also found to produce moulding or casting compositions having shape and strength retaining properties when subjected to high temperatures as well as to improve the high temperature resistance of castings and heat protective layers.

The invention appears to be based upon the discovery that certain reactions of a complex nature and which are not as yet fully understood appear to take place between elemental boron and organic or carbonaceous materials at temperatures which are sufficiently elevated. Such temperatures have been determined to be of the order of 1,300 degrees F. or greater. The results of these reactions have not been accurately determined from a strictly chemical standpoint although evidence indicates that there is some formation of boron carbide along with other boron compounds including oxides and that these form within or upon the surfaces of the refractory or other particles or fibers with which the boron has been associated in the fabrication of the product. Where the product is basically of an organic nature, it may be completely consumed or carbonized at temperatures of this magnitude but the incorporation of the boron results in a structure conforming to that originally formed. In the case of refractory materials such as glass or asbestos fibers, these will respond to their normal temperature limits and will fuse at their characteristic temperatures. In the absence of the boron additive they will fuse to lose their desired shape, or will become delaminated or otherwise disintegrate structurally and become too weak to function once the binder is consumed. However, when the boron has been incorporated, at temperatures above 1,300 degrees F. as described, the products will retain their form and structure and a certain degree of strength, depending, of course, on the degree of temperature elevation.

In the case of fiberglass laminates, it has been found that they can withstand temperatures up to about 2,700 degrees F. for substantial periods of time, and high silica fiberglass laminates formed with the boron additive and a resin binder, when shaped into a fuel nozzle, have been able to withstand temperatures for short periods as high as 4,600 degrees F. On the other hand, in the absence of boron, such laminates wil become fused or delaminated at temperatures below 2,000 degrees F. The advantages of the improved material are thus very apparent, particularly when it is considered that they are generally utilized as liners, coatings or the like and are backed up by metals or other materials having good high temperature characteristics. Thus, products of the type described can withstand high surface or "skin" temperatures such as are encountered in supersonic aircraft and missiles.

Components used in high temperature applications are generally made by building up refractory fibrous layers or laminates with suitable binders to form the desired shapes. Loose or matted or felted glass or asbestos fibers are frequently utilized in this manner. Woven fabrics formed of glass fibers are also often utilized. These are generally impregnated with suitable resins, dried and partially cured, then built into laminates or formed into desired contours over forms or in molds and the cure completed. Frequently these fibers or fabrics are applied to the surfaces of other products of metal or ceramic materials as coatings or liners.

In the practice of the invention, elemental boron particles are dispersed in the product in any suitable manner, for example, in an organic material which may be a resin solution or dispersion to be used as a binder for the fibrous material. The boron may be in the form of amorphous elemental boron having a particle size in the range of about 0.3 to 1.5 microns. The boron is dispersed in the resin solution or dispersion in any desired proportion. In general, from 1 to 2 parts by weight of boron to 1 to 5 parts by weight of resin solid have been found to be suitable proportions, the objective being to permit the deposit of boron and organic material on the fibers which are to be bound together. While synthetic resins are in general preferable because they impart desirable physical characteristics to the product of which the fibrous material is to be formed or assembled, other organic materials have also been found suitable to produce a satisfactory bond in the final product after it has been subject to elevated temperatures. Such organic materials may be sugar syrup, natural organic resins such as shellac and the like, and similar materials of an organic nature.

The boron containing binder is then utilized to impregnate or bond the fibrous material. Where a fibrous laminate is desired, the impregnated fabric is assembled in layers and compressed, the resin being at least partially cured after impregnation. In general, the resin is cured to the desired extent depending upon the manner in which the fiber is to be handled or shaped. In the case of the laminated fabric material such as impregnated fiberglass fabric, the impregnated sheet is impregnated, partially cured and assembled in layers under pressure with further cure in accordance with the conventional practice. The fabric may then be molded or shaped to the desired configuration and the cure completed. This procedure is especially adaptable for use in the case of resins which are cured in successive stages such as the phenolic or melamine resins. In case the fibrous article is to be molded or cast, the fibers are suspended or are dispersed in a binder incorporating the boron in desired proportion and then placed within a mold or other shaping means after which the resin is cured to set the product in its final desired shape.

Applicants have also found that the physical properties of the product after subjection to elevated temperatures sufficient to destroy the organic binder completely are improved if carbon, particularly in the form of graphite or carbon-black, has been incorporated in the binder along with the boron. It is also found that the physical properties are improved by the incorporation of a refractory metal oxide such as zirconia in addition to or in place of the carbon, together with the boron.

As described in the examples below, the invention is illustrated with reference to the preparation and evaluation of laminates of various types since the comparative results obtained clearly demonstrate the effectiveness of boron when utilized in the manner described.

*Example 1*

A woven glass fabric having the trade designation of No. 181 fiberglass cloth was impregnated with a mixture of a solution of a phenol-aldehyde resin in the uncured state with hexamethylene tetramine as a catalyst, plus elemental boron and graphite. The mixture was composed of the following ingredients:

| | Pounds |
|---|---|
| Resin solution (65% solids, 35% solvent) | 31.8 |
| Solvent (isopropyl alcohol) | 25.1 |
| Hexamethylene tetramine | 1. |
| Water | 1.3 |
| Graphite powder | 8. |
| Boron powder (amorphous, about 1 micron) | 15.8 |

The boron and graphite were dispersed in the resin solution and the fabric impregnated therewith. It was then laminated to prepare a composite laminate having 10 plies of fabric. The laminate was then placed in a hydraulic press and cured at a pressure of 300 p.s.i. for 25 minutes at 320 degrees F. A sample of the cured laminate was then exposed to a temperature of 2,000 degrees F. in a muffle furnace for one-half hour. This temperature was selected as representing a severe high temperature environment. The resulting product was then removed from the oven and examined. The product had retained essentially its original form and structure, but some glass exuded and it became hard and brittle and turned black in color. The layers cohered to each other and the assembly remained slightly porous. The sample was then submitted to a high temperature flexural strength test, Federal Specification LP406B, method 103T, in which the sample was flexed under load at 1,000 degrees F. The product had a flexural strength of 5,000–6,000 pounds per square inch (ultimate flexural strength to failure).

In a comparative evaluation, the glass fabric was impregnated in the resin solution but containing no boron and graphite, and then laminated into layers and cured as above. The laminate was fired at 2,000 degrees F. for one-half hour in the same manner. The resulting product was found to have fused into a lump and had completely lost its original structure. It could, therefore, not be given any flexural test.

*Example 2*

A woven fiberglass fabric which had been leached to provide a silica content of about 96% by a method similar to that described in U.S. Patent 2,491,761 was impregnated with a resin solution containing boron and graphite made up as described in Example 1. A laminate was formed of 8 plies of this fabric and cured for 25 minutes at a temperature of 300–320 degrees F. under a pressure of 300 pounds per square inch. The laminate was fired at 2,000 degrees F. in a muffle furnace for one-half hour. The product resulting was then removed, cooled and examined. The laminate had retained its structure and coherency but turned black in color. Its flexural strength at 1,000 degrees F. by the test referred to in Example 1 ranged up to 6,900 pounds per square inch.

In a comparative test on a laminate formed of the same fabric and fired in the same manner except that the plies were impregnated with the resin solution with no boron and graphite added, an examination of the product obtained after firing revealed that the individual plies retained their form and structure but were completely separated since no binder remained. The product could be given no strength test in view of this separation of plies and loss of laminated structure.

*Example 3*

A 10 ounce cotton duck fabric was laminated to form an 11 ply laminate using the resin-boron-graphite impregnating mixture described in Example 1. The laminate was formed at a pressure of 100 pounds per square inch at 320 degrees F. for 25 minutes, and then fired for one-half hour in an electric muffle furnace at 2,000 degrees F. After cooling, this product was examined and found to have retained its general shape and structure although it had turned black and shrunk somewhat. The sample had curled slightly but could be tested by the flexural strength test described in Example 1. As a result of this test it was found that the flexural strength ranged from 2,400 to 3,000 pounds per square inch.

In a comparative test the cotton fabric was laminated in the same way using the same resin solution without boron and graphite and then fired in the same manner as the previous sample. On examination, nothing whatsoever remained of the sample since it had been completely consumed.

*Example 4*

A woven high silica content fiberglass fabric of the type described in Example 2 was impregnated with a resin solution of the type described in Example 1 and containing the elemental boron but with no graphite. The impregnated fabric was laminated in 8 plies at 300 pounds per square inch at a temperature of 320 degrees F. for 25 minutes and then fired at 2,000 degrees F. for one-half hour. After cooling, the product was examined and found to have retained its general form and structure but had turned a black shiny color. It was then given a flexural strength test as described in Example 1 and found to have a flexural strength up to about 6,000 pounds per square inch. The results could then be compared with the comparative test described in Example 2 with no boron present, where the product had completely delaminated and could not be tested.

*Example 5*

An asbestos fiber mat having a thickness of 0.0055 inch was impregnated with a phenol-aldehyde resin solution containing boron as described in Example 4 and cured at 320 degrees F. It was then fired at 2,000 degrees F for one-half hour. On examination, the product was found to have retained its shape and structure although it turned black and had become slightly warped. However, it could be handled without breaking or disintegrating. In the absence of the boron, when treated otherwise in the same manner, the product crumbled and disintegrated.

*Example 6*

A cotton sheeting fabric was formed into an 11 ply laminate after impregnation with the phenol-aldehyde resin solution of Example 1, containing the dispersed boron, but without the addition of graphite. The laminate was formed by heating and curing under pressure, as in Example 3. The laminate was fired at 2,000 degrees F. for one-half hour and after cooling, the product was examined. The resultant material consisted of dark grey, warped fragments in which the original laminated structure was partially retained. The chief value of this test was to show that, while in the absence of boron, the material was completely consumed, in the presence of boron this did not occur, thus demonstrating the high temperature protective effect of the boron additive even with cotton fibers.

*Example 7*

A series of laminates of glass fabric, leached high silica glass fabric and 10 ounce cotton duck canvas was impregnated, laminated, and cured under pressure to demonstrate the effect of boron and boron-graphite additives to various resins and other types of binders. In each case the fabric was laminated in 4 plies after impregnation, and cured and pressed at 320 degrees F. for 5 minutes at pressures ranging from 5 to 1,000 pounds per square inch. A sample of each was then fired at 2,000 degrees F. for one-half hour.

*Example 8*

Samples of woven fiberglass fabric, woven leached high silicate glass fabric and cotton duck fabric, as described in Example 7, above, were impregnated with a melamine formaldehyde resin solution containing about 50% resin solids, in this solution was dispersed elemental amorphous boron particles ranging in size from about 0.3 to 1.5 microns in the proportion of about 25% by weight based on the resin solids. These impregnated fabrics were then each laminated in 4 plies as described above and fired at 2,000 degrees F. After cooling, the respective laminates were examined and the following results were noted:

(*a*) *Glass fabric laminate.*—The product had retained its shape and was hard but could be handled. Some of the glass had fused and bubbled to the surface. The laminate had retained its cohesiveness and considerable strength.

(*b*) *High silica glass fabric laminate.*—The product had retained its shape and structure as well as a considerable amount of its strength and could be handled without breaking.

(c) *Canvas.*—The product retained its original shape and remained in one piece, but had turned black and was very fragile to handle.

Example 9

A series of laminates was prepared corresponding to Example 8, except that powdered graphite in the proportion of 1 part to 2 parts of boron was added to the impregnating mixture. These were laminated and fired at 2,000 degrees F. as described above. The products obtained had the following characteristics:

(a) *Glass fiber laminate.*—The product retained its general shape and structure but had become hard and turned black. Some of the glass had fused and come to the surface but the product could be handled. In general the physical properties were similar to but somewhat better than the corresponding product in Example 8.

(b) *High silica leached glass fabric.*—The laminate retained its shape and structure and although it had turned black and hard, retained a considerable portion of its strength and could be handled without breaking.

(c) *Canvas.*—The product remained in one piece and retained its shape. The plies were still recognizable although the piece was black and carbonized with slight cracking at the edges.

Example 10

Control samples of the laminates tested in Examples 8 and 9 were prepared in the same manner except that the boron and graphite were omitted and the resin alone used as impregnant. These were fired at 2,000 degrees F. for one-half hour. The following results were noted:

(a) *Glass fabric.*—The glass fused to a large blob and the resin became carbonized and enclosed within the mass of glass.

(b) *High silica leached glass fabric.*—The resin was completely burned out, leaving the individual separated plies of the fabric.

(c) *Canvas.*—The laminate was completely consumed leaving no residue whatsoever.

Example 11

A series of three laminates corresponding to those described in Examples 7 and 8 was prepared, except that the boron was dispersed in a solution of a polyester resin of the type utilized in bonding and laminating fiberglass. After firing at 2,000 degrees F. for one-half hour, the following results were noted:

(a) *Glass fabric.*—The product became fused into a mass having the general shape of the sample.

(b) *High silica leached glass fabric.*—The laminate became hard and retained a substantial amount of structural strength.

(c) *Canvas.*—The product was carbonized and warped but the ply structure remained and the product could be handled although it was fragile.

Example 12

A control series of three laminates corresponding to Example 9 was prepared except that a polyester resin solution containing boron plus graphite was utilized as in Example 9. After firing at 2,000 degrees F. for one-half hour, the following results were obtained:

(a) *Glass fabric laminate.*—The product was 80–90% fused into a mass.

(b) *High silica leached glass fabric.*—The sample remained in good condition since it substantially retained its original shape and structure and gave a fairly strong, hard product.

(c) *Canvas.*—The product was completely carbonized but the plies were recognizable and the original shape was retained although the plies were partly delaminated.

Example 13

Control samples prepared with the polyester binder but without boron and graphite were prepared and examined as described in Example 10. The results were essentially the same and no bonding effects of the resin were noted since the organic matter was consumed or carbonized and suspended in molten glass as described.

Example 14

A series of samples fabricated as described in Example 11 was prepared except that a solution of urea-formaldehyde resin having a solids content of about 40% was utilized as the resin binder and elemental boron as described above was dispersed therein in the proportion of about 20% based on the resin solids. After the laminated samples were fired at 2,000 degrees F. for one-half hour, the following results were noted:

(a) *Glass fabric.*—The laminate was completely fused to form a block having a general shape of the original laminate.

(b) *High silica leached glass fabric.*—The general structure of the product was retained and the plies were identifiable although partly delaminated. The structure had become hard and black but could be handled and retained a substantial portion of its strength.

(c) *Canvas.*—The product was about 90% carbonized but the structure and plies were identifiable.

Example 15

A series of samples corresponding to Example 14 was prepared except that powdered graphite in the proportion of about 1 part of graphite for 2 parts of boron was dispersed in the resin solution. After firing at 2,000 degrees F. for one-half hour, the following results were noted:

(a) *Glass fabric.*—The product was 90% fused but remained identifiable in shape and structure.

(b) *High silica leached glass fabric.*—The product remained in one piece and there was no fusion while the plies remained identifiable. The product could be handled and retained a substantial proportion of its strength.

(c) *Canvas.*—The product had become completely carbonized and was too fragile to be handled.

Example 16

A series of controls was prepared according to Example 7 by utilizing the urea-formaldehyde resin solution as a binder, omitting the boron and graphite. The results obtained corresponded to those described in Example 10.

Example 17

A series of laminates was prepared in the manner described in Example 7 except that a solution of polyvinyl butyral resin was utilized as a binder, and the laminates were cooled under pressure to take care of the thermoplastic nature of the resin. Elemental boron particles were incorporated in the proportion of about 40% based on the weight of the resin. After firing at 2,000 degrees F. for one-half hour, the following results were obtained:

(a) *Glass fabric.*—The sample had become completely fused into a mass having the general shape of the original product.

(b) *High silica leached glass fabric.*—The product retained its general shape and structure with no fusion of plies being evident. There was some delamination of the plies but the product retained a substantial proportion of its strength and could be handled without disintegrating.

(c) *Canvas.*—The product was carbonized and delaminated but the fabric structure remained identifiable.

Example 18

A series of laminates was prepared in the same manner as described in Example 17 except that powdered graphite was added in addition to the boron in the proportion of 1 part of graphite for 2 parts of boron. After firing at 2,000 degrees F. for one-half hour, the following results were noted:

(a) *Glass fabric.*—The laminate had become fused but had retained its general shape and structure and the plies were identifiable.

(b) *High silica leached glass fabric.*—The product retained its general shape and structure as well as considerable amount of strength and showed only a slight degree of delamination.

(c) *Canvas.*—The product was about 90% carbonized but retained a certain amount of structure and could be identifiable as fabric.

Example 19

A series of controls prepared according to Example 7 but utilizing polyvinylbutyral as a binder with no boron and graphite, gave results essentially similar to those set forth in Example 10 and indicated that the resin was completely consumed and exerted no binding or bonding effect on the fibers. In the case of the canvas, no residue of any kind remained.

Example 20

A series of controls was prepared as described in Example 7 utilizing a solution of nylon as the resinous binder material. Boron as described above was dispersed in the nylon solution in the proportion of 1 part of boron for each 3 parts of resin solids, the resin being utilized in solution in a proportion of about 35% by weight. After firing at 2,000 degrees F. for one-half hour, the following results were noted:

(a) *Glass fabric.*—The product was partly fused but retained its general structure and was identifiable as fabric since the original fabric structure was retained.

(b) *High silica leached glass fabric.*—The product retained its original shape and structure and a considerable amount of strength. There was some warping and the product was somewhat delaminated.

(c) *Canvas.*—The product was carbonized and delaminated but the fabric structure remained identifiable.

Example 21

A series of samples corresponding to those described in Example 20 was prepared in the manner referred to in Example 7 except that powdered graphite was incorporated with the boron in the nylon resin solution in the proportion of roughly 1 part of graphite for each 2 parts of boron. After firing at 2,000 degrees F. for one-half hour, the following results were noted:

(a) *Glass fabric.*—The product was partly fused and delaminated by retained its general structure and the individual plies could be distinguished.

(b) *High silica leached glass fabric.*—The product retained its general shape and structure and a considerable amount of strength. A slight delamination was indicated around the edges of the sample.

(c) The product was carbonized and delaminated but the fabric structure remained identifiable.

Example 22

A series of control samples utilizing nylon resin but omitting the boron and graphite was fired at 2,000 degrees F. and the results noted. The results conformed essentially to those obtained and described in Example 10, indicating that the resin binder was consumed completely or else carbonized and suspended in fused glass. In the case of the canvas, the sample was completely consumed.

Example 23

A series of laminates as described in Example 7 was prepared utilizing a solution of a silicon resin as the binding agent. A suitable solid content of the order of 40–50% of resin in a ketone solvent was utilized and elemental boron particles having a particle size in the range of 0.3 to 1.5 microns were dispersed in the resin in the proportion of about 40% based on the weight of resin solids. After the laminate was fired at 2,000 degrees F. for one-half hour, the following results were noted:

(a) *Glass fabric.*—The sample had become fused but had retained its original shape and structure. There was no delamination or shrinkage.

(b) *High silica leached glass fabric.*—The laminate remained in good condition and retained its original shape and structure plus a considerable amount of strength. The product had become hardened and dark in color, but was otherwise sound.

(c) *Canvas.*—The product had become carbonized but remained in one piece and the fabric structure could be identified although some blistering of the surface was apparent. The product was fragile but could be handled.

Example 24

A series of laminates was prepared as described in Example 23 except that graphite was added in addition to the boron in the proportion of about 1 part of graphite for each 2 parts of boron. After firing at 2,000 degrees F. for one-half hour, the following results were noted:

(a) *Glass fabric.*—The product had been fused in one piece but retained its original shape and structure and the pattern of the fabric remained and retained appreciable strength.

(b) *High silica leached glass fabric.*—The product retained its original shape and structure and a substantial degree of strength and could be handled without breaking.

(c) *Canvas.*—The product had become completely carbonized but retained its general shape and structure and the fabric pattern remained recognizable.

Example 25

In a series of controls corresponding to Examples 23 and 24, but without the presence of any boron and graphite, the samples after firing gave results similar to those described in Example 10, indicating that the resin had been completely consumed or carbonized and that there is no residual binding effect upon the laminate.

Example 26

A series of laminates prepared according to Example 7 but utilizing an alcoholic solution of shellac as the binding resin was prepared, and the laminates were cooled under pressure because of the thermoplastic nature of the resin. The shellac was utilized in the proportion of about 50% solids and boron was incorporated therewith in the proportion of about 25% by weight of the resin. After lamination the products were fired at 2,000 degrees F. and the following results noted:

(a) *Glass fabric.*—The laminate remained in one piece and retained substantially its original shape and structure but the glass had fused together.

(b) *High silica leached glass fabric.*—The laminate became slightly delaminated but retained its original shape plus a considerable amount of strength.

(c) *Canvas.*—The product was carbonized and delaminated but the general structure was retained and the piles were individually identifiable.

Example 27

A series of samples corresponding to Example 26 was prepared but in which graphite was incorporated with the boron in the proportion of about 1 part of graphite for 2 parts of boron and after firing at 2,000 degrees F. for one-half hour, the following results were noted:

(a) *Glass fabric.*—The product was about 90% delaminated and the glass had become fused but otherwise the general shape and structure was retained.

(b) *High silica leached glass fabric.*—The laminate retained its original shape and structure and a considerable degree of strength but a slight amount of cracking was noted.

(c) *Canvas.*—The product was carobnized and delaminated but the fabric structure remained identifiable.

Example 28

A series of controls utilizing shellac as the binding resin but without the addition of any boron or graphite gave results substantially corresponding to those noted in Example 10 and indicated that the high temperatures had consumed or carbonized the organic material and destroyed the bonding or binding power of the resin. In the case of canvas, the sample was completely consumed.

Example 29

A series of laminates was prepared as described in Example 7, utilizing sodium silicate solution as a binder. A standard commercial sodium silicate solution containing about 40% of sodium silicate and about 25% of boron powder incorporated therewith based on the weight of sodium silicate. The laminates were prepared under pressure but the heating for curing was omitted except that the laminates were thoroughly dried before firing. After firing at 2,000 degrees F. for one-half hour, the products were examined and the following results noted:

(a) *Glass fabric.*—The glass had fused into a solid mass within 15 minutes.

(b) *High silica leached glass fabric.*—The laminate remained in one piece but the mass had fused into a single unit to give a very brittle hard product which could not be handled and in which the fabric structure was not identifiable.

(c) *Canvas.*—About half of the material was completely consumed and the remainder was carbonized and covered with a mass of fused silicate.

Example 30

A series of laminates prepared in accordance with Example 29 except that 1 part of graphite for each 2 parts of boron was incorporated along with the sodium silicate binder. After firing at 2,000 degrees F., the following results were noted:

(a) *Glass fabric.*—The sample was removed from the oven in 5 minutes in a completely fused condition. The resulting mass would not support its own weight and disintegrated completely on handling.

(b) *High silica leached glass fabric.*—The sample was removed after half an hour from the furnace in a fused mass, the plies being completely fused together and unidentifiable. The mass was hard, brittle and had to be handled carefully to avoid complete disintegration.

It is apparent that the silicate had acted as a flux and reduced the melting point of the glass and high silica fabric.

(c) *Canvas.*—The product had become completely carbonized and was extremely brittle. The product consisted of a fused mass of silicate containing dispersed carbon.

The above results clearly demonstrate that the following conclusions can be drawn:

(1) In the absence of the boron additive, at temperatures substantially above the decomposition temperature of organic materials, the resin is completely consumed or is carbonized and becomes suspended or dissolved in any glass present which also becomes fused into a molten mass.

(2) In the absence of the boron additive, the resin is ineffectual as a binding or bonding agent after high temperature firing.

(3) The incorporation of boron into a fibrous mass in the presence of the organic binder or other organic material with or without the addition of graphite powder, serves to improve the high temperature characteristics of various types of fibers whether of organic or inorganic nature, with these properties being retained even after firing at temperatures of 2,000 degrees F.

(4) The presence of carbonaceous material or carbon in some form along with the boron is essential to develop the high temperature characteristics of the material.

The results obtained by the use of boron deposited on the fibrous material indicate that regardless of the nature of the fiber, the presence of boron improves the heat resistance of the material and increases the structural strength of products formed therefrom subjected to temperatures above the combustion temperature of organic materials. While the tests were carried out at 2,000 degrees F., the reinforcing characteristics are imparted once temperatures sufficiently high to cause the apparent reaction involving elemental boron to take place. Such temperature appears to be of the order of about 1,300 degrees F. or higher. The proportions of boron utilized are not critical but it has been found that significant improvement is obtained when about 2% or more of the boron is deposited on the fibers by weight or when the boron is utilized as a component of the impregnant in the proportion of from about 10% to 75% based on the resin or organic binder by weight. However, observable improvement has been noted using as low as 1% of boron based on resin solids. These results are demonstrated by the following examples:

Example 31

A phenol-aldehyde resin solution corresponding to that described in Example 1 was prepared containing 10% boron and 5% graphite based on the resin solids. Glass fabric, high silica glass fabric and canvas laminates were prepared as described in Example 7. These were then fired at 2,000 degrees F. for one-half hour. The following results were noted:

(a) *High silica fabric laminate.*—The product retained its form and structure and remained in one piece as a serviceable laminate.

(b) *Glass fabric laminate.*—The material retained its shape although the resin had carbonized and the glass had fused with some warpage.

(c) *Canvas.*—The material had been converted about 90% to ash but retained an identifiable cloth structure.

Example 32

A series of laminates was prepared and fired as in Example 31, except that 5% boron and 2½% graphite were incorporated. The following results were noted:

(a) *High silica fabric laminate.*—The product remained in one piece but was about 25% delaminated. It was also quite fragile.

(b) *Glass fabric laminate.*—The resin had completely carbonized and the laminate had fused together. The product was badly warped.

(c) *Canvas.*—The material was about 90% consumed but some remaining fragments retained their structure as a fabric.

Example 33

A series of laminates was prepared and fired as in Example 31, except that 1% boron and ½% graphite were added. The following results were obtained:

(a) *High silica glass laminate.*—The sample remained in one piece but could be easily delaminated.

(b) *Glass fabric laminate.*—The material retained its shape but was fused, carbonized and badly warped.

(c) *Canvas.*—The sample was completely consumed.

The above results indicate a certain degree of improvement when compared with the control samples described in Example 2, even down as low as 1% boron based on the resin, which would be of the order of about 0.25% based on the fibers.

Applicants have further discovered that the high temperature resistance imparted by the incorporation of boron with these fibrous or filamentary materials can be further improved by the added incorporation of refractory metal oxides, particularly refractory oxides of metals of groups III and IV of the periodic table, such as zirconia, titania, alumina, silica and the like. This is demonstrated clearly by the results shown in the following example:

*Example 34*

A resin solution of an uncured phenol-aldehyde resin with a catalyst was made up as described in Example 1. Boron, graphite and zirconia, as the refractory metal oxide, were then suspended in the solution. The composition of the dispersion was as follows:

| | Pounds |
|---|---|
| Phenol-aldehyde resin solution (65% solids) | 25.3 |
| Graphite | 2.1 |
| Boron powder | 4.2 |
| Zirconia | 17.0 |
| Isopropyl alcohol | 12.6 |
| Water | 0.9 |
| Hexamethylene tetramine | 0.7 |

The dispersion was then used to impregnate a high silica leached fiberglass fabric of the type described above. After drying and partially curing, the fabric was made into a 9 ply laminate and cured under pressure of 100 pounds per square inch at 320 degrees F. for 25 minutes. The sample was then fired at 2,000 degrees F. for one-half hour. After firing it was found that the sample retained its structure and a considerable amount of strength. The fired sample was then given a flexural strength test as described in Example 1. The product was found to have an ultimate flexural strength at 1,000 degrees F. of 8,200 pounds per square inch. This clearly verified the increased strength at high temperatures imparted by the boron-zirconia mixture.

In addition to the improved high temperature strength characteristics imparted to fabrics by the incorporation of the boron additive, it has been found that similar improvement is obtained by utilization of boron in reinforced resin casting or molding compositions regardless of whether fiber is present or not, thus indicating that the effectiveness of boron is applicable to any materials which are bonded by an organic binder to define a given structure, said structure being retained at high temperatures despite the combustion of the binder. These advantages are particularly applicable where the bound or bonded material is itself of a refractory nature.

Applicability of this invention to molding or casting compositions is illustrated by the following examples:

*Example 35*

A casting composition was prepared using a conventional catalyzed phenolic casting resin composition. The phenolic resin was a mixture of phenol alcohols containing a small proportion condensed to an advanced stage. Thirty parts of resin compound was mixed with 45 parts of 240 grit silicon carbide as an abrasive filler. About 8 parts of powdered boron was added to the mixture. The mixture was cast into a small block and cured, after which it was fired at 2,000 degrees F. for one-half hour. The resulting product was a hard, solid mass which retained its general shape and structure. On the other hand, the same composition without the boron, after firing, resulting only in a mass of powder representing the original carbide particles.

*Example 36*

A molding composition was prepared as follows:

| | Parts |
|---|---|
| Phenol-aldehyde resin (Novalak type) | 50 |
| Catalyst (hexamethylene tetramine) | 2.5 |
| Filler (200 mesh silica) | 35 |
| Boron powder | 10 |
| Graphite powder | 5 |

The above molding composition was shaped under heat and pressure into a small block at 320 degrees F. and 1,000 pounds per square inch. It was then fired at 2,000 degrees F. for one-half hour. The product retained its shape and was strong and hard. Under the same conditions, without the boron, the firing produced a powdered residue consisting only of the silica.

Similar results are obtained by the incorporation of boron particles into coating, lining, cementing or sealing compositions where refractory fillers such as fibers, silica or clay particles, carbides or the like are suspended or dispersed in organic binders. Such compositions after firing at elevated temperatures above 1,300 degrees F. provide refractory coatings which retain strength and continuity and furnish high temperature protection to surfaces coated therewith.

We claim:

1. A plastic moulding and casting composition having improved high temperature strength characteristics when heated to temperatures of at least 1300° F. comprising an organic resinous material, a refractory filler, and elemental boron dispersed therein.

2. The method of improving the high temperature strength characteristics of fiberglass laminates which comprises dispersing finely divided particles of elemental boron in an organic resin composition, impregnating a woven fiberglass fabric therewith, assembling said impregnated fabric into a laminated multi-ply structure, forming and curing said laminate into a desired shape, and subjecting the resulting product to a temperature of at least 1,300 degrees F.

3. An article having improved strength characteristics when subjected to temperatures above 1,300° F. which comprises a fibrous mass of material having dispersed therein elemental boron and carbonaceous material in contact with said boron.

4. An article according to claim 3 wherein a portion of said carbonaceous material is elemental carbon in sufficient amount to enhance the heat resistant characteristics of the article.

5. An article according to claim 3 wherein a portion of the carbonaceous material is an organic binder and the elemental boron is dispersed therein.

6. An article according to claim 5 wherein a portion of the carbonaceous material is elemental carbon in sufficient amount to enhance the heat resistant characteristics of the article and the carbon is dispersed in the organic binder.

7. An article according to claim 6 wherein the elemental carbon is graphite.

8. An article according to claim 7 wherein the binder is a member of the group consisting of natural and synthetic resins.

9. An article according to claim 3 wherein the fibrous mass contains in addition a refractory oxide dispersed therein.

10. An article according to claim 3 wherein the fibrous mass consists essentially of refractory fibers.

11. An article according to claim 3 wherein the fibrous mass is a silica glass fabric.

12. An article having improved high temperature strength characteristics at temperatures above 1,300° F. which comprises a refractory fibrous material impregnated with an organic binder; and elemental boron and graphite dispersed within said binder.

13. An article according to claim 12 wherein the binder is a member of the group consisting of natural and synthetic resins.

14. An article according to claim 12 wherein the refractory fibrous material is a silica glass fabric and the binder is phenol-aldehyde resin.

15. A new product of manufacture having improved strength characteristics when heated to temperatures of at least 1300° F. comprising a plurality of layers of fibrous material impregnated with an organic binder having particles of elemental boron dispersed therein.

16. The product according to claim 15 wherein the binder is a member of the group consisting of natural and synthetic resins and in which at least two parts of boron by weight, based on the weight of the fibrous material, are dispersed in the resin.

17. An article according to claim 15 wherein powdered graphite in sufficient amount to enhance the heat resistant characteristics of the article is dispersed in the binder.

18. An article according to claim 17 wherein a refractory oxide is dispersed in the organic binder.

19. An article according to claim 18 wherein the refractory oxide is zirconia.

20. An article according to claim 17 wherein the fibrous material is silica glass fabric and the binder is phenol-aldehyde resin.

References Cited in the file of this patent

UNITED STATES PATENTS

| | | |
|---|---|---|
| 2,184,316 | Plummer | Dec. 26, 1939 |
| 2,544,320 | Hurd | Mar. 6, 1951 |
| 2,636,825 | Nicholson | Apr. 28, 1953 |
| 2,637,091 | Nicholson | May 5, 1953 |
| 2,699,415 | Nachtman | Jan. 11, 1955 |
| 2,835,107 | Ward | May 20, 1958 |